UNITED STATES PATENT OFFICE.

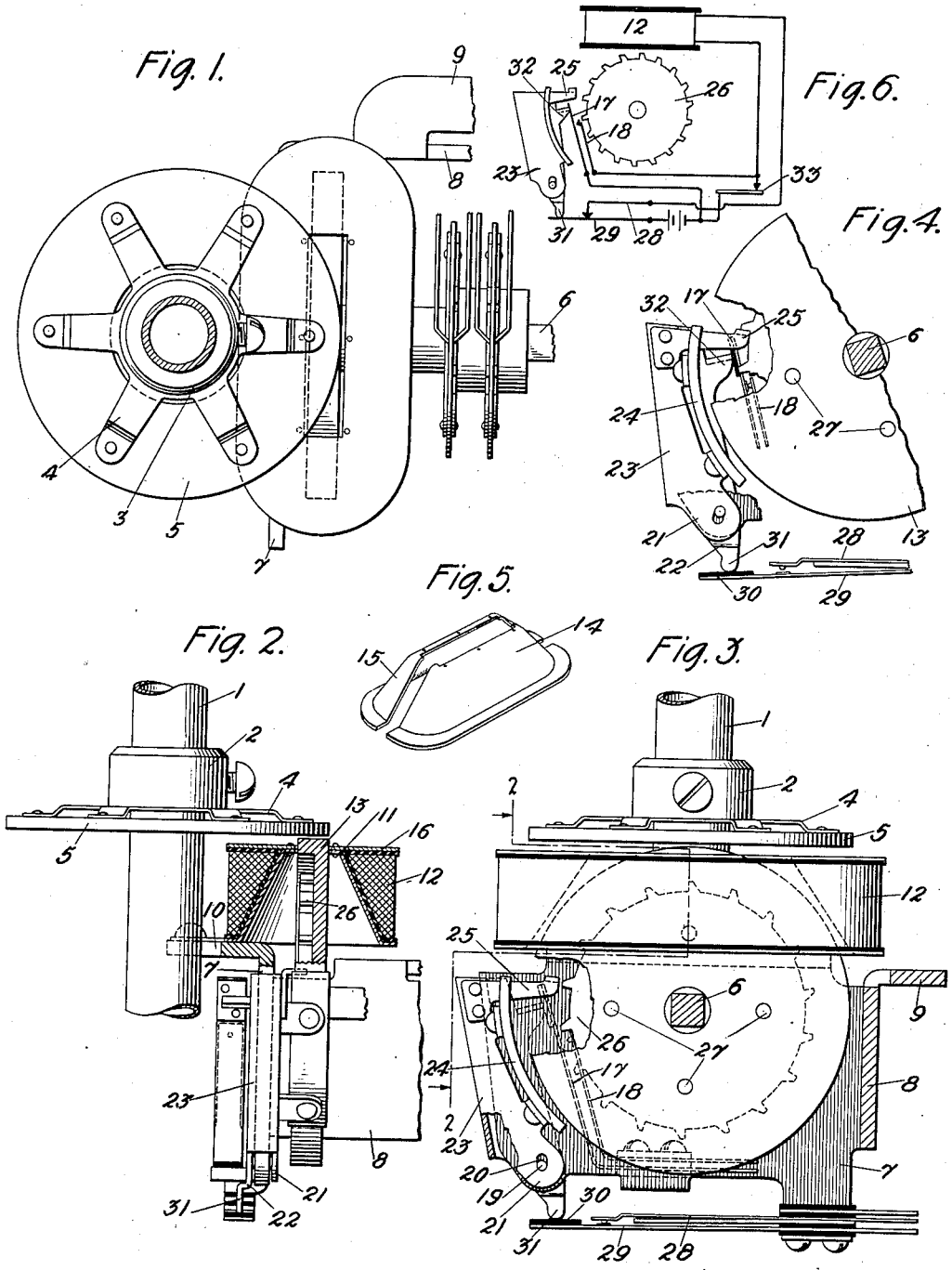

ARTHUR H. ADAMS, OF SPARKILL, NEW YORK, ASSIGNOR TO WESTERN ELECTRIC COMPANY, INCORPORATED, OF NEW YORK, N. Y., A CORPORATION OF NEW YORK.

SWITCH-OPERATING MECHANISM.

1,296,604.  Specification of Letters Patent.  Patented Mar. 11, 1919.

Application filed March 31, 1916. Serial No. 88,118.

*To all whom it may concern:*

Be it known that I, ARTHUR H. ADAMS, a citizen of the United States, residing at Sparkill, in the county of Rockland and State of New York, have invented certain new and useful Improvements in Switch-Operating Mechanisms, of which the following is a full, clear, concise, and exact description.

This invention relates to electrically operated clutch mechanisms for coupling a sequence switch, a selector switch or any other desired device to a power shaft, so as to be driven therefrom.

One of the objects of the present invention is to so arrange the windings of the clutch magnet as to secure a greater efficiency than by means heretofore employed.

Another object of the invention is to provide means for positively stopping the driven member at any one of a number of positions.

In the drawings, which show the invention applied to a sequence switch structure similar to that disclosed in patent to Reynolds and Baldwin 1,127,808—Figure 1 is a side view of the device showing the power shaft in cross-section; Fig. 2 is a view on the line 2—2 of Fig. 3, showing the clutch magnet and part of the driven member in section; Fig. 3 is an end view of the device with parts broken away; Fig. 4 is a detail view of the pawl and ratchet device for positively stopping the driven member; Fig. 5 is a detached view showing the two-piece structure of the spool on which the magnet coil is mounted; and Fig. 6 is a circuit diagram showing the manner in which the driven member is positively and definitely stopped at any desired one of its stopping positions.

Referring to the drawings, 1 is a shaft which is continuously rotated by any desired means. Secured to said shaft, in any desired manner, is a collar 2, to which is fastened the spider 3 having a plurality of radially projecting flexible arms 4. Secured to the outer ends of the arms 4, and concentrically with the shaft 1, is an annular friction member 5.

Rotatably mounted, adjacent to the friction member 5 and at right angles to the shaft 1, is the driven shaft 6. In the present disclosure the end of shaft 6, adjacent to shaft 1, is mounted in the supporting plate 7. The plate 7 is provided with a portion 8 extending at right angles thereto, and the portion 8 in turn has its edge turned at right angles as at 9. The portions 8 and 9 may be employed as a mounting means for the driven member. The opposite end of the member 8 may be turned at right angles, and used as a mounting for the opposite end of the shaft 6. The plate 7 is also provided with a laterally projecting portion 10 to which is secured the spool 11 of the clutch magnet 12.

Fixed to the driven shaft 6, in any desired manner, is the friction disk 13, the plate 7 being so mounted that the circumference of the disk 13 will be immediately adjacent to the face of the annular friction member 5, near the outer edge thereof.

Briefly, the operation of the device is as follows: Upon the energization of the magnet 12, magnetic lines of force flow through the disk 13, the supporting members 7 and 10, shaft 1 and annular friction member 5. As the arms 4 are readily flexed, the friction member 5 is forcibly drawn into engagement with the friction disk 13, thus causing the disk 13, and consequently the shaft 6 to which it is secured, to be rotated by the power shaft 1 through the medium of the friction member 5.

The mounting or spool 11 of the coil 12 is oblong and hollow, and that portion of the disk 13 adjacent to the member 15, is within the coil. The spool 11, is formed of the pieces 14 and 15 of stamped metal, which are secured together by being riveted to the common end plate 16, and tapers toward the circumference of the disk 13. Forming the spool of pieces of stamped metal, as just described, permits it to be cheaply made and readily formed so as to closely surround the disk 13. The spool being tapered causes the greater portion of the winding of coil 12 to lie near the edge of the disk 13, where it is most effective, Secured in the plate 7, with its ends projecting from opposite faces thereof, is a pin 19. Loosely mounted on the pin 19, by means of the elongated slots 20, are the arms 21 and 22 of the channel-like member 23, within which projects the edge of the plate 7. Rigidly secured to the channel member 23, in any desired manner, are the curved strip of magnetic material, 24 and the stop member or pawl 25.

Fixed to the shaft 6, in any desired manner, is the ratchet wheel 26. In the present disclosure this ratchet wheel is secured to the recessed face of the disk 13 by means of rivets 27.

Insulatively secured to the plate 7 is a pair of contact springs 28 and 29. Spring 29 is provided at its loose end with a piece 30 of insulation which engages the projecting end 31 of the arm 22 to normally hold the channel member 23 in its uppermost position, as shown in Fig. 3. The springs 28 and 29 will be arranged to govern the circuit of magnet 12.

The contact springs 17 and 18 are also insulatively mounted on the plate 7. Spring 17 engages the projection 32 on the pawl 25, and by its resiliency tends to force the pawl away from the teeth of the ratchet wheel 26. When pawl 25 is retracted, contacts 17 and 18 are separated, but when said pawl is drawn into operative relation to said ratchet wheel these contacts are in engagement.

Assuming now that the circuit for magnet 12 is closed through contacts 28 and 29, a source of current and an external controlling contact 33 Fig. 6, friction disk 5 will be drawn into engagement with disk 13, and 13 will begin to rotate. At the same time the strip 24 of magnetic material will also be attracted toward the disk 13, but will be prevented from engaging the disk by channel 23 engaging the edge of plate 7. The pawl or stop member 25, however, will be placed in the path of one of the teeth on the ratchet wheel 26. Thus, when the ratchet wheel has been rotated a distance nearly equal to the distance between adjacent ratchet teeth, pawl 25 will be engaged, channel 23 will be forced downwardly against the tension of spring 29, and spring 29 will be forced from engagement with spring 28. This will open the circuit of magnet 12 and allow the driving member 5 to be drawn from engagement with the disk 13, at the instant the channel 23 reaches its lowermost position (see Fig. 4). The driven member will be stopped in a definite position, and the pawl 25 will be retracted by spring 17, engaging projection 32 on the member 24. Spring 29 will now return the member 23 to its original position and in doing so will again engage the contact 28.

If the circuit of magnet 12 is now closed at the external controlling contact 33, magnet 12 will be again energized, and the above described cycle of operations will be repeated over and over until the circuit of magnet 12 is opened at a point other than at contacts 28 and 29.

The contacts 17 and 18 are provided to insure that the driven member 6 will take a complete step even though contact 33 is opened while the said member is in transit from one position to the next. Due to the forward movement of pawl 25, contacts 17 and 18 will be forced together, closing a substitute energizing path for magnet 12 in parallel with contacts 33. Thus the magnet 12 at each energization will provide a locking circuit for itself through contacts 17 and 18, and will break this locking circuit by opening contacts 28 and 29 when the member 6 completes its step.

By the above structure, means are provided whereby the driven member is given a step-by-step movement, and is caused to come to a definite stop in each of the positions corresponding to the teeth on the ratchet wheel 26, so that when the contact controlling the circuit of magnet 12 is opened, the device will be brought to rest in a definite position. This centering or stopping in definite positions is of particular importance in sequence switch structures similar to that disclosed in the above mentioned patent.

What is claimed is:

1. In a power transmitting mechanism, a driving member and a driven member, a helix for causing said driven member to be operatively connected to said driving member, a series of stops on said driven member, and a pawl arranged to be attracted into the path of said stops by the energization of said helix.

2. In a power transmitting mechanism, a driving member and a driven member, a helix for causing said driven member to be operatively connected to said driving member, a series of stops on said driven member, a pawl arranged to be attracted into the path of said stops by the energization of said helix, and means for opening the energizing circuit of said helix upon engagement of said pawl by one of said stops.

3. In a power transmitting device, a driving member and a driven member, a helix for causing operative engagement of said members, a ratchet wheel on said driven member, a pawl arranged to be attracted into engagement with said ratchet wheel by the energization of said helix and contacts controlled by said pawl for opening the circuit of said helix upon being engaged by a tooth of said ratchet wheel.

4. In a power transmitting device, a driving member and a driven member, a helix for causing operative engagement of said members, an energizing circuit for said helix, a ratchet wheel on said driven member, a stop pawl arranged to be attracted into engagement with said ratchet wheel by the energization of said helix, contacts associated with said pawl for controlling said circuit, and means for displacing said pawl by the engagement of one of the teeth of said ratchet wheel with said pawl to open said contacts and cause the deënergization of said helix.

5. In a power transmitting mechanism, a driving member and a driven member, a helix for causing said driven member to be operatively connected to said driving member, a series of stops on said driven member, a pawl, means for moving said pawl into the path of said stops upon energization of said helix, and contacts operated by said pawl upon being attracted for closing a holding circuit for said helix.

6. In a power transmitting mechanism, a driving member and a driven member, a helix for causing said driven member to be operatively connected to said driving member, a series of stops on said driven member, a pawl, means for moving said pawl into the path of said stops upon energization of said helix, contacts operated by said pawl for closing a holding circuit for said helix, and contacts operated by said pawl upon engagement of said pawl by one of said stops for opening the energizing circuit of said helix.

7. In a power transmitting device, a driving member and a driven member, a helix for causing operative engagement of said members, a ratchet wheel on said driven member, a longitudinally displaceable pawl arranged to be attracted into engagement with said ratchet wheel by the energization of said helix, and contacts actuated by said pawl upon being moved by a tooth of said ratchet for opening the circuit of said helix.

8. In a power transmitting device, a driving member and a driven member, a helix for causing operative engagement of said members, an energizing circuit for said helix, a ratchet wheel on said driven member, a bodily displaceable pawl, contacts associated with said pawl for controlling said circuit, means for moving said pawl into operative engagement with said ratchet wheel upon energization of said helix, contacts closed by said pawl in moving to operative position for closing a locking circuit for said helix, and means for displacing said pawl when engaged by one of the teeth of said ratchet to open said first mentioned contacts and break said holding circuit.

9. In a power transmitting mechanism, a flexibly mounted rotatable disk, an oblong tapered spool consisting of a pair of complementary winding supporting stampings arranged with its smaller end adjacent to the face of said disk, a helix on said spool, said helix being substantially triangular in cross section and arranged with the base of the triangle adjacent and substantially parallel to the face of said disk, whereby the greater winding of the helix is adjacent the edge of the said disk, a second rotatable disk arranged with its edge projecting through said spool, and means for energizing said helix to attract said first disk into engagement with said second disk and cause said disks to rotate together.

10. In a power transmitting mechanism, a flexibly mounted rotatable disk, a two-piece metallic hollow spool arranged with its smaller end adjacent to the face of said disk, a second rotatable disk arranged with its edge projecting through said spool, said spool being tapered and its inner surface curved to substantially conform to the contour of the circumference of said disk, a helix on said spool, said helix being substantially triangular in cross section and arranged with the base of the triangle adjacent and substantially parallel to the face of said disk, whereby the greater winding of the helix is adjacent the edge of the said disk and means for energizing said spool to attract said first disk into engagement with said second disk and to cause said disks to rotate together.

11. In a power transmitting device, a driving member and a driven member, a helix for causing operative engagement of said members, a ratchet wheel on said driven member, a displaceable pawl arranged to be attracted into engagement with said ratchet wheel by the energization of said helix, and contacts actuated by said pawl upon being moved by a tooth of said ratchet wheel for opening the circuit of said helix.

12. In a power transmitting mechanism, a driving member and a driven member, a helix for causing said driven member to be operatively connected to said driving member, a stop on said driven member, and a pawl arranged to be attracted into the path of said stop by the energization of said helix.

13. In a power transmitting mechanism, a driving member and a driven member, a helix for causing said driven member to be operatively connected to said driving member, a stop on said driven member, a pawl arranged to be attracted into the path of said stop by the energization of said helix, and means for opening the energizing circuit of said helix upon engagement of said pawl by said stop.

14. In a power transmitting mechanism, a driving member and a driven member, a helix for causing said driven member to be operatively connected to said driving member, two series of contacts in circuit with said helix, one set normally open and one set normally closed, a series of stops on said driven member, a pawl, and means for moving said pawl into the path of said stops upon energization of said relay for closing one set of contacts and opening the other set of contacts.

In witness whereof, I hereunto subscribe my name this 27th day of March A. D., 1916.

ARTHUR H. ADAMS.